United States Patent
Monturo

(10) Patent No.: US 7,913,410 B2
(45) Date of Patent: Mar. 29, 2011

(54) DEVICE FOR MEASURING OVERALL LENGTH OF A FIREARM

(75) Inventor: Christopher Monturo, Dayton, OH (US)

(73) Assignee: Chris Monturo, Centerville, OH (US)

( * ) Notice: Subject to any disclaimer, the term of this patent is extended or adjusted under 35 U.S.C. 154(b) by 92 days.

(21) Appl. No.: 12/455,259

(22) Filed: Jun. 1, 2009

(65) Prior Publication Data

US 2010/0299950 A1    Dec. 2, 2010

(51) Int. Cl.
*G01B 1/00*  (2006.01)
(52) U.S. Cl. .................................. 33/506; 33/806
(58) Field of Classification Search .............. 33/506, 33/806, 832; D10/64; 206/317; 42/1.01
See application file for complete search history.

(56) References Cited

U.S. PATENT DOCUMENTS

| | | | |
|---|---|---|---|
| 735,935 A | 8/1903 | Billings | |
| 1,555,792 A * | 9/1925 | Souder | 33/810 |
| 3,138,306 A * | 6/1964 | Bare | 206/317 |
| 3,811,562 A * | 5/1974 | Smith | 206/317 |
| 4,203,227 A | 5/1980 | Giroux | |
| 4,653,194 A | 3/1987 | Kim | |
| 4,670,990 A * | 6/1987 | Horvath | 33/562 |
| D308,643 S * | 6/1990 | Ellard et al. | D10/64 |
| 4,939,849 A * | 7/1990 | Johnson | 33/811 |
| 5,491,907 A * | 2/1996 | Vidmar | 33/832 |
| 5,604,989 A * | 2/1997 | Stevenson | 33/506 |
| 6,086,375 A | 7/2000 | Legros | |
| 6,256,896 B1 * | 7/2001 | Landauer | 33/512 |
| 6,983,548 B1 * | 1/2006 | Cook et al. | 33/515 |
| 7,228,638 B2 * | 6/2007 | Goodwin | 33/511 |
| 7,287,338 B2 | 10/2007 | Foege | |
| D610,927 S * | 3/2010 | Garthoff et al. | D10/70 |

* cited by examiner

*Primary Examiner* — Amy Cohen Johnson
*Assistant Examiner* — Tania C Courson

(57) ABSTRACT

A measuring device for measuring the overall length of a firearm is constructed with a rectangular base with a back plate affixed perpendicular to the base. One end of the base is fixed with a plate attached perpendicular to the base. The other side of the device has a movable plate that rides back and forth on a rail. Underneath the rail is a ruler which is used to read the overall length of the firearm. The design of the fixture will allow for repeatable measuring of firearms. Also, the sliding plate ensures the furthest point of the firearm is that being measured regardless of the angle at which the barrel is cut.

3 Claims, 1 Drawing Sheet

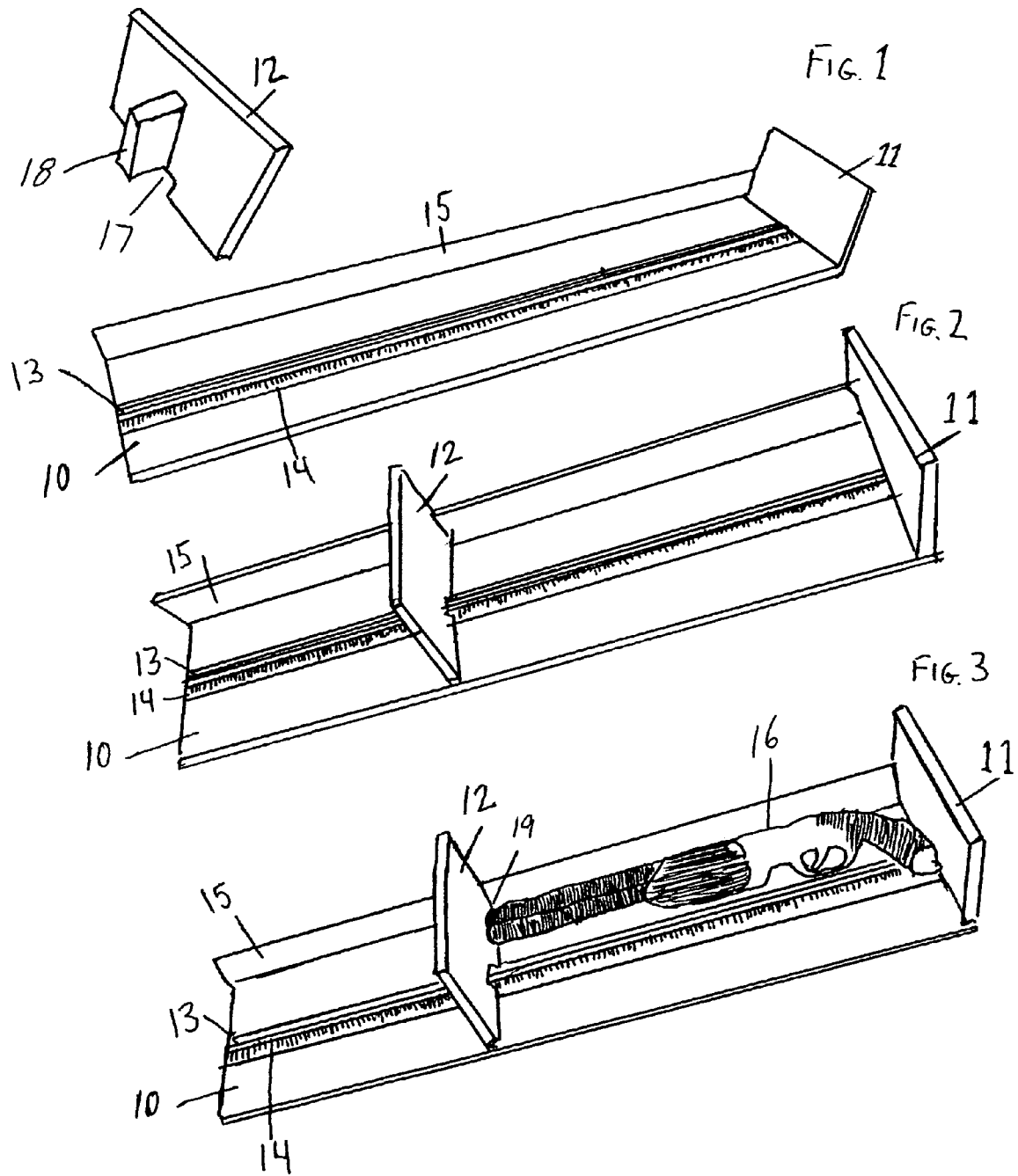

DEVICE FOR MEASURING OVERALL LENGTH OF A FIREARM

TECHNICAL FIELD

This invention is designed to reproducibly measure the overall length of a firearm as it pertains to the legal definition.

BACKGROUND OF THE INVENTION

Federal law, 26 U.S.C. §5845(a), states that rifles and shotguns must have an overall length of 26 inches. Additionally, many states have similar laws mandating a minimum length of long arms. To correctly measure the overall length for the purpose of determining the legality of a firearm, it must be measured from the furthest point of the rear stock to the most forward point of the barrel along the axis of the firearm.

One problem the present invention addresses is inconsistency of measurement by different people. This can be caused by holding the ruler in a variety of positions resulting in a variety of measurements. Also, measuring the firearm diagonally can cause incorrect measurements. These incorrect measurements can affect the legal ramifications associated with a criminal case.

The present invention assures the firearm is positioned correctly, thus preventing the potential for incorrect measurement. The incorporation of the fixed ruler under the sliding rail assists in accurately measuring the length of a firearm with the ruler being positioned perpendicular with the axis of the firearm.

SUMMARY OF THE INVENTION

An object of the invention is to ensure multiple users will position a firearm uniformly onto the device for consistent measuring. The raised walls of the device allow for the placement of the firearm so that the axis of the barrel is parallel to the ruler. The ruler is removable for any service necessary and adjustment.

BRIEF DESCRIPTION OF THE DRAWINGS

FIG. 1 is the front view of the overall measuring device with the ruler in place under the rail.

FIG. 2 is the front view with the sliding plate in place on the rail

FIG. 3 is the measuring device with a shotgun in place for measurement.

DETAILED DESCRIPTION OF THE DRAWINGS

The device is chiefly described in FIG. 3 with an elongated measuring base (10) which is attached to a fixed end plate (11). There is a fixed back plate (15) which runs the length of the device. Along the length of the base (10) there is a raised slotted rail (13) with a ruler (14) having linear measuring indicia thereon and wherein the ruler is located adjacent to the rail (13). Both the rail and the ruler are parallel to the fixed back plate. A moveable sliding plate (12) having an index panel (19) which extends upward from said moveable sliding plate (12), rides along the rail (13). There is a slight recess (17) in the sliding plate (12) which allows the plate to be positioned closer to the ruler (14). The sliding plate (12) has a fixed tail piece (18), located above the slight recess (17) which ensures it frictionally engages the raised slotted rail (13) securely.

In further accordance with the invention, FIG. 3 is illustrative of measuring a firearm (16) with a cut off stock and shortened barrel. The firearm (16) is placed with the rear against the end plate (11). The top of the firearm is placed with the barrel of the firearm (16) parallel to the back plate (15). Once the firearm (16) is in place, the movable side plate (12) is slid forward until it comes into contact with the end of the firearm (16) barrel. The length of the firearm can be read by observing the ruler (14) where it crosses the side plate (12).

In the preferred embodiment, the entire device is constructed of aluminum, but may be made of other quality materials. The ruler (14) used is constructed of stainless steel.

Even though this invention has been demonstrated and described with respect to some embodiments, it will be understood that various changes in form may be made without departing from the scope and spirit of the claimed invention.

I claim:

1. A device for measuring the overall length of a firearm consisting:
   an elongated measuring base having a ruler having at least one sequence of linear measuring indicia thereon extending from one end of the measuring base parallel to the axis of elongation that measures the overall length of the firearm and further having a raised slotted rail extending substantially the length of the measuring base parallel to the axis of elongation,
   a fixed end back plate extending upward from said one end of the elongated measuring base for placing one end of the firearm and;
   a fixed back plate extending upward along the length of the measuring base, located perpendicular to the fixed end back plate, and;
   a measuring movable sliding plate connected between the ends of the elongated measuring base for placing the other end of the firearm and to accommodate measuring a variety of firearm lengths, said measuring movable sliding plate consisting;
      a slight recess that frictionally engages with the raised slotted rail,
      a fixed tailpiece that ensures engagement with the raised slotted rail and extends perpendicular to the movable sliding plate;
      an index panel extending upward from said movable sliding plate and having an indicating relationship with said at least one sequence of measuring indicia located along the length of the elongated measuring base.

2. The measuring device of claim 1, wherein the overall length of the ruler is 36 inches in length.

3. The measuring device of claim 1, wherein the ruler has linear measuring indicia in the Metric system or the English system.

* * * * *